July 4, 1961 W. F. SKLENAR 2,991,060
REVERBERATORY FURNACE
Filed April 16, 1958 3 Sheets-Sheet 1
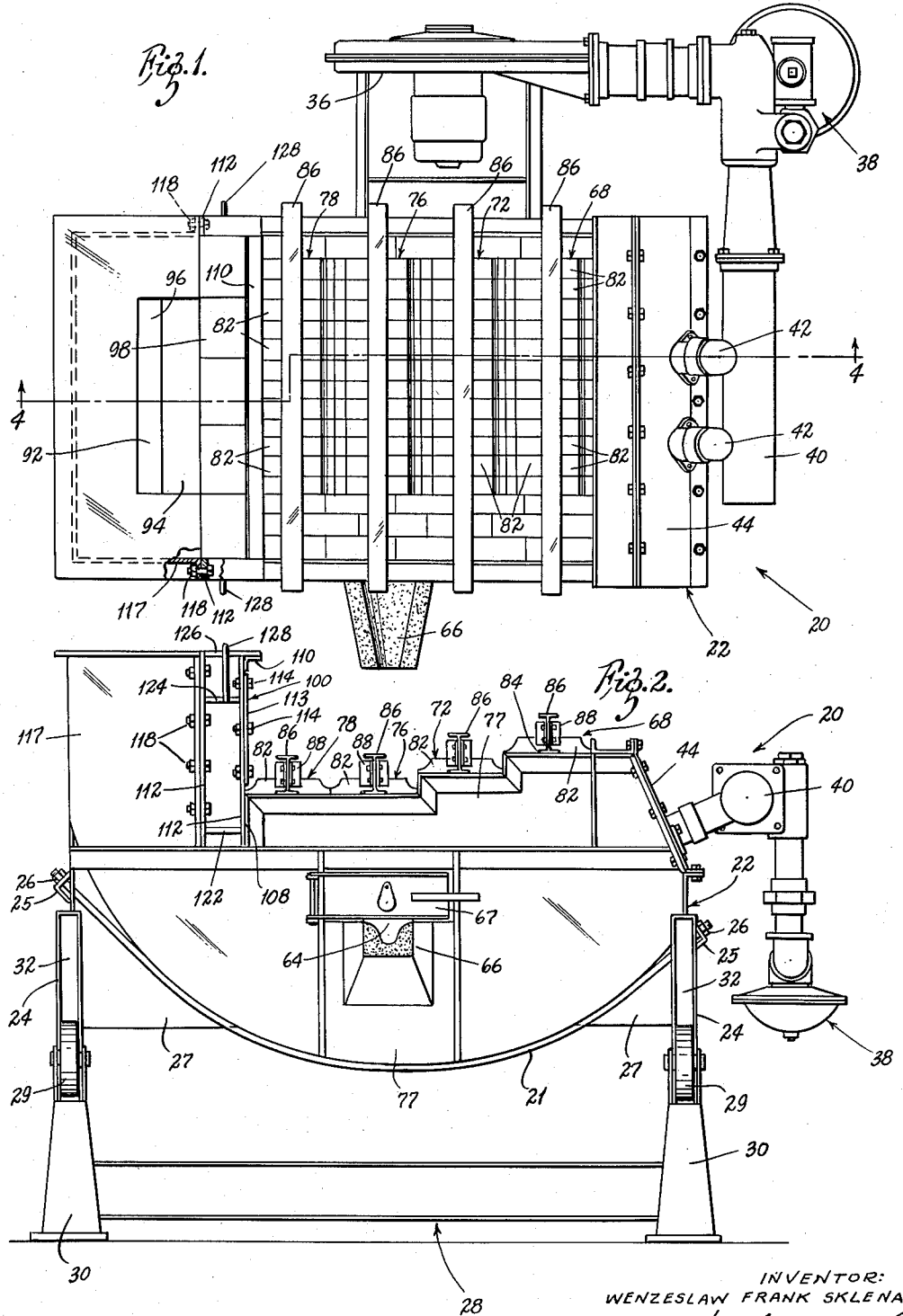
INVENTOR:
WENZESLAW FRANK SKLENAR,
BY Kingsland, Rogers & Ezell
ATTORNEYS

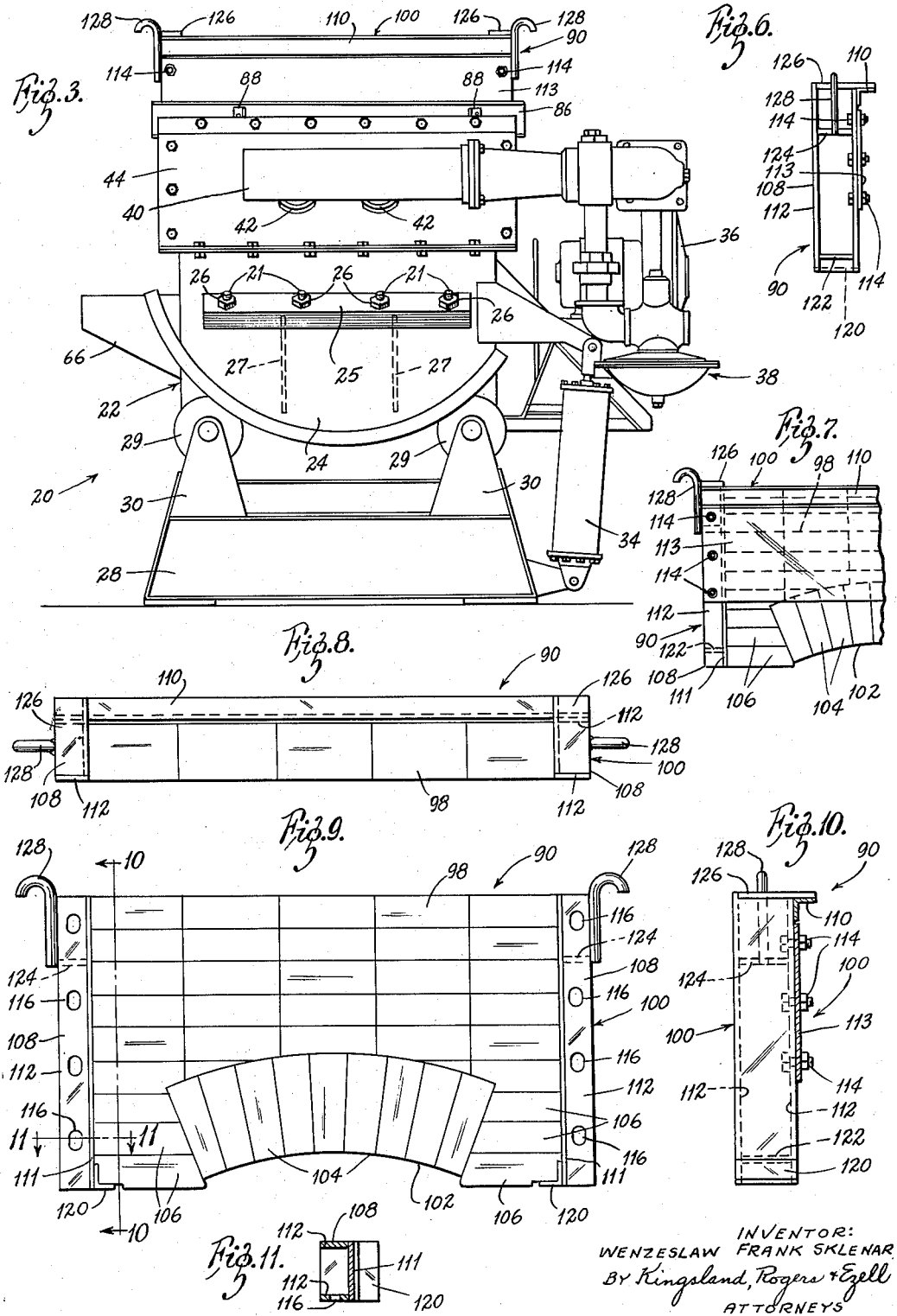

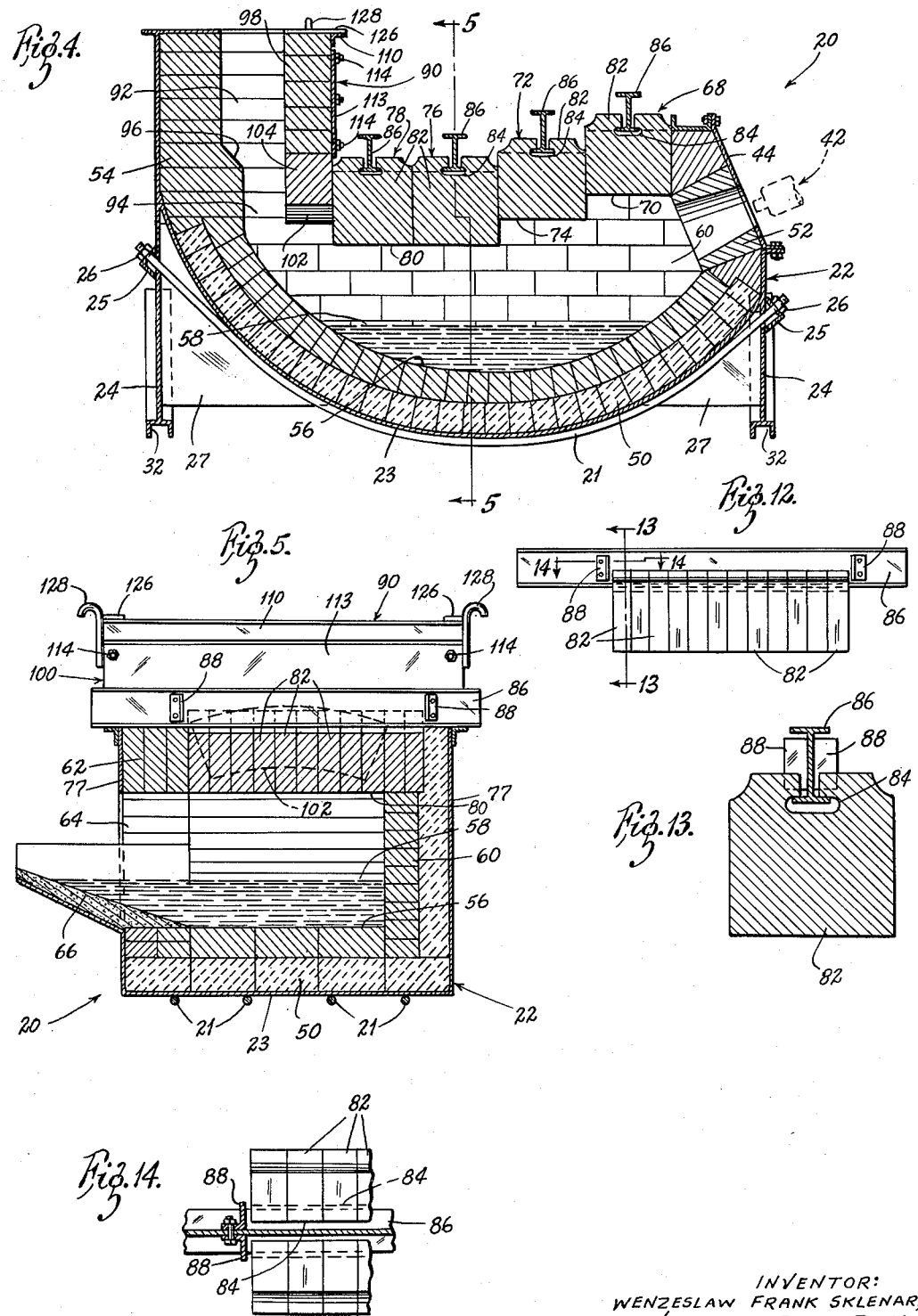

United States Patent Office 2,991,060
Patented July 4, 1961

2,991,060
REVERBERATORY FURNACE
Wenzeslaw Frank Sklenar, 33 N. Pennsylvania Ave., Belleville, Ill.
Filed Apr. 16, 1958, Ser. No. 728,809
6 Claims. (Cl. 263—11)

The present invention relates generally to furnaces for melting metals, and more particularly to a reverberatory furnace arranged to provide increased efficiency of overall heat transfer and constructed in a manner to enable rapid and easy repair and replacement of wall components subject to severe wear in the attainment of unusually high heating efficiency.

Briefly, the invention contemplates useful improvements in reverberatory metal melting furnaces of the general type disclosed in my subsisting Patents No. 2,436,-124, issued February 17, 1948; No. 2,470,728, issued May 17, 1948; and No. 2,510,352, issued June 6, 1950. In each of the foregoing disclosures, I have deemed it expedient to effect heat transfer from the combustion of appropriate fuel by both radiation and direct conduction to the metal being treated.

The exceptionally high heating efficiency attained in my previous furnaces is not without some sacrifice in the life of the refractory lining of the furnace particularly in the vicinity of the melting zone, where the maximum rate of heat transfer occurs. Thus, whereas the present invention contemplates an improved configuration of the furnace interior, which leads to even higher heat transfer efficiency, the invention extends also to an improved structural arrangement whereby the repair and replacement of wall components subjected to severe wear is greatly facilitated.

It is an object of the present invention, therefore, to provide a fuel-fired reverberatory metal melting furnace having exceptionally high heating efficiency.

It is another object of the invention to provide a reverberatory metal melting furnace which attains high metal melting efficiency through efficient concentration of heat in the melting zone of the furnace.

It is another object of the invention to provide a reverberatory metal melting furnace which attains efficient concentration of heat in a desired zone, at least in part, through the development of high gas turbulence.

It is another object of the invention to provide a reverberatory metal melting furnace which attains efficient heat transfer through a combination of heat reflection and heat conduction.

It is another object of the invention to provide a reverberatory metal melting furnace having planar reflecting roof sections.

It is another object of the invention to provide a hopper-fed reverberatory metal melting furnace incorporating a replaceable prefabricated bridge wall section adjacent the inlet hopper.

It is another object of the invention to provide a hopper-fed reverberatory metal melting furnace wherein the hopper has predeterminate dimensional restriction adjacent its inlet to the furnace.

The foregoing, along with additional objects and advantages, will be apparent from the following description of a particular embodiment of the invention, as illustrated in the accompanying drawings, in which:

FIGURE 1 is a top plan view of a reverberatory furnace conforming to the present invention;

FIGURE 2 is a side elevation thereof, the view being taken from the lower side of FIGURE 1;

FIGURE 3 is an end elevation thereof, the view being taken from the right of FIGURES 1 and 2;

FIGURE 4 is a longitudinal vertical cross section of the furnace taken generally along the line 4—4 of FIGURE 1, the fuel-firing elements being generally omitted;

FIGURE 5 is a transverse vertical cross section taken generally along the line 5—5 of FIGURE 4;

FIGURE 6 is an end elevation of a removed prefabricated bridge wall;

FIGURE 7 is a fragmentary side elevation of the bridge wall of FIGURE 6, the view being taken from the right of the latter figure;

FIGURE 8 is an enlarged top plan view of the bridge wall of FIGURES 6 and 7;

FIGURE 9 is an enlarged side elevation of the bridge wall, the view being generally similar to that of FIGURE 7, but taken from the opposite side of the wall;

FIGURE 10 is a vertical section taken generally along the line 10—10 of FIGURE 9, but with the tiles omitted;

FIGURE 11 is a horizontal section taken generally along the line 11—11 of FIGURE 9;

FIGURE 12 is a side elevation of a roof panel assembly;

FIGURE 13 is a vertical cross section taken generally along the line 13—13 of FIGURE 12; and FIGURE 14 is a horizontal cross section taken generally along the line 14—14 of FIGURE 12.

Referring to the drawings more particularly by means of the reference characters applied thereto, the numeral 20 designates generally a reverberatory furnace constructed in accordance with the teachings of the present invention. Although the furnace 20 here illustrated is shown as a tilting type, it is to be understood that a stationary furnace may provide an equally suitable environment for the invention. As shown, the furnace 20 has an external metal shell 22 which covers the four sides and the bottom in generally conventional arrangement as set forth in my previous patents above mentioned. However, the present shell assembly 22 is materially improved over those previously disclosed by the incorporation of a plurality of tension rods 21 which underlie a lower contoured support plate 23 and extend through parallel arcuate support assemblies 24 at opposite ends of the furnace. The rods 21 are tensioned against the assemblies 24 through the medium of bearing angles 25 and nuts 26, and gussets 27 are provided between the assemblies 24 and the shell plate 23 to accommodate the tension force. A base 28 provided with rollers 29 on spaced stanchions 30 supports the shell assembly 22 through the arcuate end assemblies 24, the latter being provided with roller tracks 32 as clearly illustrated in the drawings. A power cylinder 34 (FIG. 3), which may be hydraulic or pneumatic, interconnects the base 28 with the shell 22 and serves as a means for tilting the furnace 20.

Various fuels may be employed for firing the furnace 20, including gas, oil, and solid pulverized fuel. The fuel, mixed with air, is introduced at the front end of the furnace 20. Thus, the drawings depict a blower 36 which cooperates with appropriae fuel control mechanism 38 to deliver a combustible fuel mixture to a plenum 40 to which are connected suitable gun-type burners 42 extending through a header plate 44 forming an end portion of the shell assembly 22. Although the drawings depict fuel handling equipment primarily suited to gaseous fuel, it is to be understood that conventional equipment for handling liquid or pulverized fuel may be substituted as desired.

Directing attention now to FIGURES 4 and 5, which show the refractory lining of the furnace 20, a main floor or hearth 50 comprises multiple courses of fire brick, or the like, formed to the general arcuate longitudinal configuration illustrated in FIGURE 4 extending upwardly to the level of burner blocks 52 at the front, and to a somewhat higher level to join with a vertical rear wall 54. The resulting bowl-like cavity 56 serves to accommodate a pool of molten metal designated generally by the numeral 58. FIGURE 5 shows the side walls of the furnace lining to be vertical. One side wall 60 comprising multiple courses of fire brick is solid, whereas the opposite side wall 62 is provided with an opening 64 into which a pouring spout 66 and a door 67 (FIG. 2) are fitted.

The roof of the furnace 20 includes a plurality of individual assemblies presenting horizontal panel-like surfaces to the interior of the furnace chamber. Moreover, as clearly illustrated in FIGURE 4, these interior roof surfaces are disposed at different selected levels for the purpose of providing a predetermined pattern of heat reflection and gas flow within the furnace 20.

Thus, a roof panel assembly 68 (FIG. 4) at the front of the furnace presents a lower horizontal surface 70 which is at the upper level of the burner block 52. A second panel assembly 72 presents a horizontal planar surface 74 of equal area with the surface 70, but at a lower level. Still further, roof panel assemblies 76 and 78, together, provide a lower horizontal surface 80. This latter surface 80 is disposed at a still lower level than the surface 74. The level of the roof panel assemblies 76 and 78, as well as the levels of the assemblies 68 and 72 may be adjusted individually to effect variable action of the gases. The overall configuration of the furnace roof as defined by the several roof panels disposed at different levels has important significance in the efficiency of heat transfer to be attained in the furnace 20, as will appear.

The roof panel assemblies 68, 72, 76 and 78 are generally identical one to the other end, as illustrated preferably take the form of a plurality of identical tiles suspended from an elongated beam. Various forms of suspended roof members may be employed, one example comprising tiles 82 shown in FIGURE 13, each including a T-slot 84 by means of which it may be suspended from an I-beam 86. FIGURE 12 illustrates a complete assembly wherein a plurality of the tiles 82 are suspended from a beam 86 and are secured thereon by means of angle clips 88 removably bolted in place as shown in FIGURE 14. Clearly, this arrangement enables the roof panels to be preassembled so that they may be set into the furnace 20 as complete units. The extended ends of the beams 86 rest upon the opposite side walls 60 and 62 as shown in FIGURES 4 and 5. It will, of course, be understood that the tops of these side walls are appropriately stepped so that the surfaces 70, 74 and 80 may be disposed at predetermined different levels as above described. The side view of FIGURE 2 illustrates a side panel 77 of the furnace shell 22 stepped in conformity with the foregoing arrangement of the side walls and the roof panels.

Rearwardly of the roof panel assembly 78, the side walls 60 and 62 are carried to a higher level so as to cooperate with the aforementioned rear vertical wall 54 and with an intermediate bridge wall assembly 90 to define a hopper space 92 which communicates with the furnace chamber as clearly illustrated in FIGURE 4. Preferably, the hopper space 92 has substantially large cross-sectional area in its upper portion, but a more restricted cross-section area over a vertically elongated lower throat portion 94 adjacent the lower end of the intermediate wall assembly 90. This restricted throat portion 94 is best effected by providing an offset 96 in the rear vertical wall 54. The vertically elongated lower throat portion 94 may be adjusted to provide an opening of cross-sectional area suitable for the class of metal to be melted.

The intermediate bridge wall assembly 90, like the individual roof panel assemblies previously described, is preferably formed as a prefabricated assembly which can be installed as a unit in the furnace 20 and lends itself to ready replacement.

FIGURES 6 through 11 depict a preferred construction of the suspended bridge wall assembly 90. As best shown in FIGURES 7, 8 and 9, the assembly comprises a wall 98 of refractory tiles supported in a fabricated metal frame 100. The wall 98 may have a thickness of one or more tiles, an overall thickness of six inches being typical, but by no means required. The central lower portion of the wall 98 is unsupported by the frame 100 and, consequently, is arranged in the form of a sprung arch 102 utilizing tapered tiles 104 supported at the ends of the arches by special arch end tiles 106. The remaining tiles in the wall 98 are set up in conventional rectangular arrangement, in either stacked or overlapped array as desired.

The frame 100 for supporting the wall 98 includes an edge assembly comprising vertical end members 108 interconnected by a horizontally extending angle 110. A cross section of the vertical end members 108 is depicted in FIGURE 11 and shows a channel section composed of a back plate 111 to which side flange plates 112 are welded. In addition to the cross angle 110, the end members 108 are interconnected by a plate or tension member 113 removably secured by bolt assemblies 114 to the outside surfaces of the same flange plates 112 to which the angle 110 is secured. The opposite flange plate 112 of each end member 108 is provided with elongated apertures 116 by means of which the bridge wall assembly 90 is secured to side panels 117 forming part of the metal furnace shell 22. This latter connection is by means of bolt assemblies 118, as clearly illustrated in FIGURE 2.

Each of the end members 108 is provided at its lower end with an inwardly projecting angle clip 120 which underlies an outer end of the wall 98 to provide vertical support therefor. Added rigidly is provided in each end member 108 by the incorporation of gusset plates 122, 124 and 126, disposed as best illustrated in FIGURES 6 and 10, and preferably welded into place. The uppermost gusset 126 overlies the cross angle 110 and is firmly affixed thereto, as by welding. Each of the end members 108 is also provided with a hook 128, affixed by welding to the gussets 124 and 126 and serving as means for suspending the bridge wall assembly in inserting or removing it from the furnace 20.

*Operation*

The furnace 20 is suited for either batch melting, ordinarily used in non-ferrous melting, or continuous service, frequently desired in the melting of metals having relatively high melting points, such as the ferrous metals. Firing of the furnace is effected in conventional manner by means of the burners 42 and the accessory combustion devices 36, 38 and 40. As previously indicated, the furnace hearth 50, in conjunction with the side walls 60 and 62, defines a cavity 56 in which a pool of molten metal 58 may accumulate, to be maintained in a fully melted condition ready for pouring into ladles or molds. Pouring is effected through the spout 66 at the opening 64 in the wall 62 when the whole furnace 20 is tilted on the rollers 26.

Normally, metal will be charged or added in the solid state by way of the hopper 92 at the rear of the furnace 20 opposite the burners 42. The charged metal may comprise various scrap items, along with ingots of appropriate size, and the charged items will tend to accumulate in relatively close-packed condition in the restricted portion 94 of the hopper 92. Inasmuch, however, as the gaseous products of combustion from the burners 42 are emitted from the furnace 20 by way of the hopper 92, it is evident that these gases will pass at relatively high velocity in intimate contact with the solid pieces of metal occupying the throat, or restriction, 94. Heat transfer by direct conduction from the combustion gases to the solid metal is, of course, greatly enhanced by the close packing of the pieces in the throat 94, which serves to constrict the passageway and, hence, to develop increased velocity and turbulence of the gases at this point. As the combustion gases pass upwardly beyond the constricted throat portion 94, they continue to flow over and in direct contact with the relatively cold metal most recently charged into the hopper 92, thereby giving up the maximum portion of heat.

As metal at the lower end of the constricted passage 94 softens, it moves downwardly beneath the arch 102 of the bridge wall 98 and accumulates at a normal angle of repose until it melts and flows downwardly into the pool 58. The rear end of the hearth 50 beneath the arch 102, where the final melting takes place, is the hottest zone in the furnace chamber.

Directing attention now to FIGURES 4 and 5, which together depict the interior configuration of the furnace chamber, the arrangement is clearly such that the flames from the burners 42 are directed generally downwardly toward the molten metal pool 58. At the same time, the roof structure of the furnace 20 is relatively low with respect both to the burners 42 and the pool 58. Thus, FIGURE 4 shows the planar surface 70 of the forward panel assembly 68 to be disposed only slightly above the level of the burner 42, the surface 74 of the panel assembly 72 approximately at the same level as the burner 42, and the extended planar surface 80 defined by the panel assemblies 76 and 78 to be below the level of the burners 42. These surfaces 70, 74 and 80, by their close proximity to the pool 58, serve both to confine the gaseous products of combustion from the burners 42 close to the hearth 50 and the pool 58, and also to provide a direct reflecting surface for reverberatory heat reflection directly down onto the surface of the pool 58.

As previously noted, and as clearly illustrated in FIGURE 5, the surfaces 70, 74 and 80 are horizontal and planar, as contrasted to a more conventional arcuate transverse configuration.

The vertical displacement of the successive panel assemblies 68, 72 and 76, 78 provide discontinuities between the panels which aid in producing turbulence in the gases which impinge against the roof structure, which turbulence aids both in the complete combustion of the gases and in increased dissemination of heat through the elimination of stratification in the gases. The extended planar surface 80 near the rear end of the furnace chamber engenders maximum gas velocity at this end of the pool 58 in which the newly melted and, hence, relatively cool molten metal enters. This, coupled with the close proximity of the reflecting surface 80, serves to provide a "maximum temperature" zone at the rear end of the pool 58 as previously indicated.

It has already been mentioned that the exceptional heat transfer efficiency of the instant furnace 20 is not accomplished without some sacrifice in the wear life of the furnace lining. The areas which receive particularly severe wear are those comprising the roof panels 68, 72, 76 and 78, along with the bridge wall 98. The necessity for periodic repair and replacement of these sections would, under normal practices, keep the furnace out of operation for a period of days at a time when repair work was being done. This disadvantage is completely overcome, however, in the present arrangement wherein, not only the panel assemblies 68, 72, 76 and 78, but also the bridge wall assembly 90 can be quickly and easily lifted as individual units from the furnace 20. Prefabricated replacement assemblies can then be moved into place and the period of furnace repair and out-of-service time is reduced from days to a matter of hours. It will also be noted that removal of the roof and bridge wall sections provides ready access to the whole interior of the furnace 20 for repair of the hearth 50 or the side walls 60 and 62, as well as the rear vertical wall 54.

Clearly, there has been provided a reverberatory metal melting furnace which fulfills the objects and advantages sought therefor.

It is to be understood that the foregoing description and the accompanying drawings have been given only by way of illustration and example. It is further to be understood that changes in the elements, rearrangement of parts, or the substitution of equivalent elements, all of which will be obvious to those skilled in the art, are contemplated as being within the scope of the invention, which is limited only by the claims which follow.

What is claimed is:

1. In a reverberatory metal melting furnace, in combination, a refractory hearth having longitudinal curvature including a rearward upward sweep, a pair of side walls flanking said hearth and cooperating with the latter to provide a concavity for containing a pool of molten metal, a burner wall extending upwardly from the forward end of the hearth between the side walls, a hopper wall extending upwardly from the rearward end of the hearth between the side walls, and a plurality of transversely extending elongated refractory assemblies disposed in contiguous parallel relationship spanning the side walls above the hearth, said assemblies being constructed for individual removal and replacement as units and extending in consecutive abutment from the burner wall to within a predetermined clear space forwardly of the hopper wall, the removable refractory assembly closest to the hopper wall comprising a bridge wall confined in a metal frame, the metal frame including a vertical member at each end of the wall, said vertical members being coextensive with the end surfaces of the wall and including inwardly extending flanges in underlying relation with at least a portion of the adjacent ends of the wall.

2. The furnace of claim 1 wherein the metal frame for the bridge wall includes a tension member extending across the forwardly disposed face of the bridge wall and interconnecting the vertical end members.

3. The furnace of claim 2 wherein the hopper wall, the side wall portions, and the bridge wall extend upwardly substantially beyond the top of the removable refractory assembly immediately forward of the bridge wall, and wherein the tension member across the front face of the bridge wall comprises a plate covering the major portion of the front face area above the removable refractory assembly immediately forward of the bridge wall.

4. In a reverberatory metal melting furnace, in combination, a refractory hearth in the shape of a receptacle for molten metal, having a bottom wall, a pair of side walls flanking said bottom wall and a roof over the side walls, a burner wall extending upwardly from the forward end of the hearth between the side walls and the roof, walls adjacent the rear end of the hearth providing a combination flue and hopper to receive metal to be melted, the flue walls including upwardly extending rear and side flue walls, and a bridge wall closing the forward side of the flue above the roof, and extending downwardly below the top of the roof to dispose its lower edge at the junction of the flue and the receptacle to form the corner between them, and its upper edge projecting above the top of the roof, the bridge wall comprising a unitary structure having a refractory lining, and means releasably to secure the unitary bridge wall structure to the side flue walls, so that it may be detached and replaced by releasing the securing means and substituting a similar unitary bridge wall, the bridge wall including a metal frame, forming a forward metal wall for the flue above the roof, metal parts depending below the frame and extending inwardly, the refractory lining being mounted within the frame and extending below it, and being supported by the depending metal parts.

5. The furnace of claim 4, wherein the roof comprises a plurality of panels extending across the top of the furnace, the panels being individually removable from the furnace; and the bridge wall and adjacent roof panel being constructed for removal without removal of any remaining parts of the roof.

6. The furnace of claim 4, wherein the refractory lining of the flue provides a relatively wide upper flue, and has a ledge projecting into the flue and providing a relatively narrower flue from the ledge down into the receptacle.

References Cited in the file of this patent

UNITED STATES PATENTS

| | | |
|---|---|---|
| 1,138,066 | Bean | May 4, 1915 |
| 2,013,966 | Kuzell | Sept. 10, 1935 |
| 2,098,586 | Marble | Nov. 9, 1937 |
| 2,436,124 | Sklenar | Feb. 17, 1948 |
| 2,470,728 | Sklenar | May 17, 1949 |
| 2,510,352 | Sklenar | June 6, 1950 |
| 2,585,552 | Hosbein | Feb. 12, 1952 |
| 2,662,764 | Arutunoff | Dec. 15, 1953 |
| 2,699,741 | Bowman | Jan. 18, 1955 |